April 8, 1958 F. W. KIRCHHOFF 2,829,800
MIXING AND METERING DEVICE FOR FUEL MIXTURES
Filed June 14, 1955 2 Sheets-Sheet 1
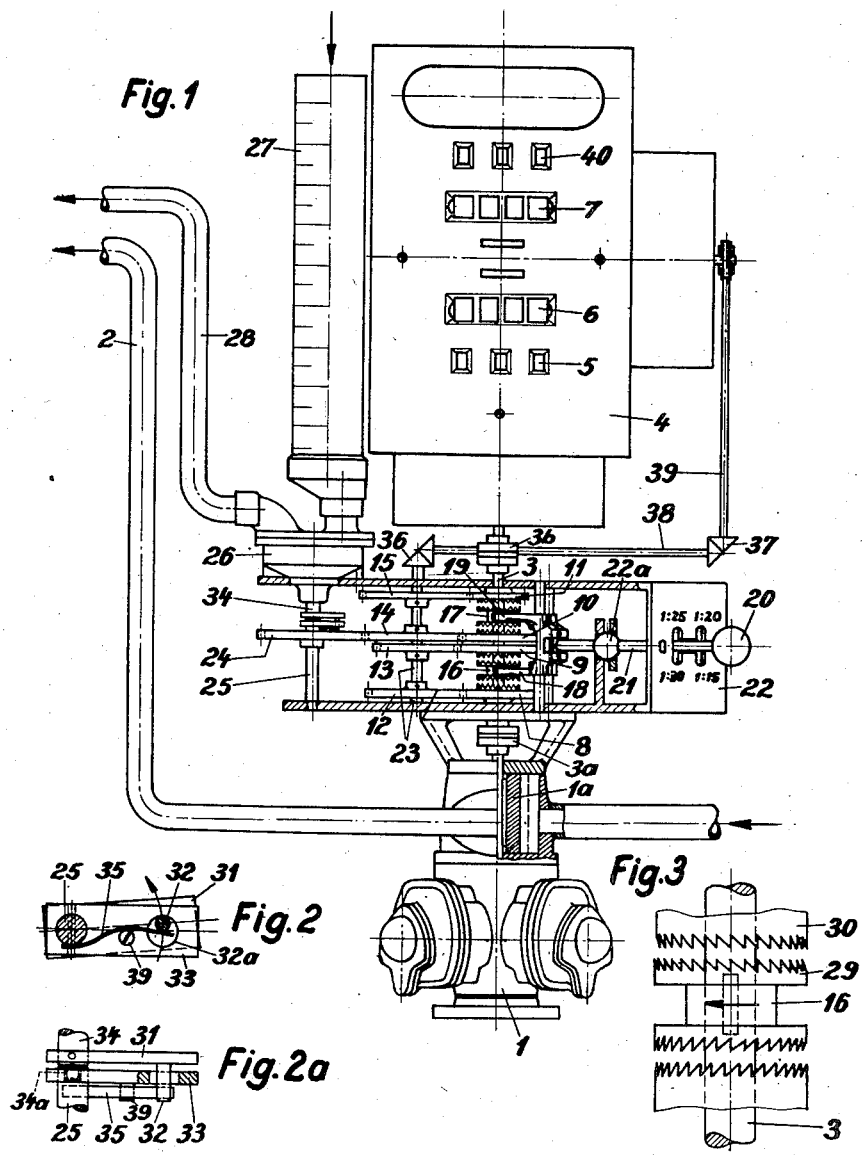
Inventor:
Friedrich W. Kirchhoff
By Walter Becker
Patent Agent April 8, 1958  F. W. KIRCHHOFF  2,829,800
MIXING AND METERING DEVICE FOR FUEL MIXTURES
Filed June 14, 1955  2 Sheets-Sheet 2
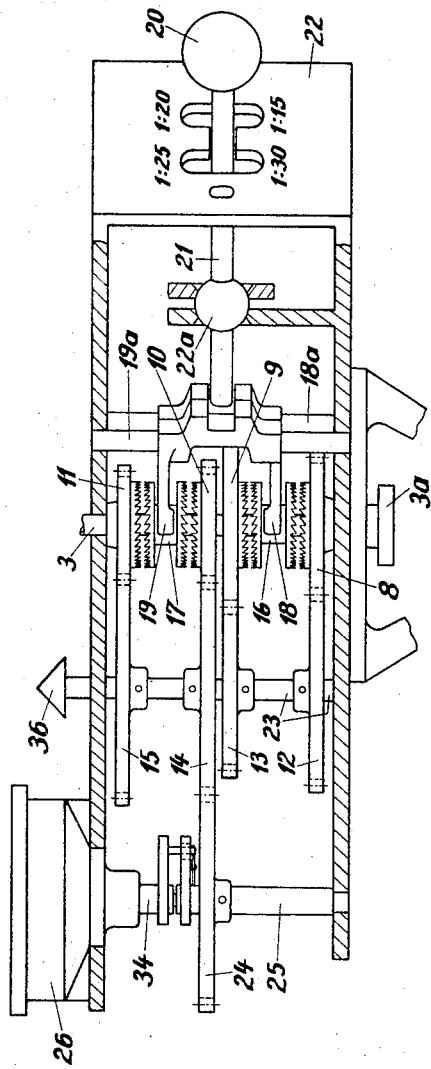
Inventor:
Friedrich W. Kirchhoff
By
Patent Agent

United States Patent Office 2,829,800
Patented Apr. 8, 1958

2,829,800

MIXING AND METERING DEVICE FOR FUEL MIXTURES

Friedrich W. Kirchhoff, Paderborn, Germany, assignor to Deutsche Gerätebau Gesellschaft mit beschränkter Haftung, Salzkotten, Germany Application June 14, 1955, Serial No. 515,352

Claims priority, application Germany June 25, 1954

7 Claims. (Cl. 222—26)

The present invention relates to a mixing and metering device for fuel mixtures at filling stations and the like. More specifically the present invention relates to a mixing and metering device for fuel mixtures composed of a main constituent and a subsidiary constituent, in which the feeding pump for the subsidiary constituent is driven by a rotative measuring element for the main constituent through the intervention of a variable gear transmission.

A mixture of fuel containing a gasoline as main constituent and having an admixture of oil is used as fuel mixture for various types of vehicle engines. This gasoline-oil mixture which previously was generally prepared by hand in a separate mixing vessel, is nowadays withdrawn from special mixture dispensing installations having associated therewith a metering device which can be set in conformity with the respective desired mixture ratio. Generally with such mixture dispensing installations, the admixture of the subsidiary constituent such as oil is generally effected in such a manner that the oil of the fuel delivery conduit is fed either by gravity and in precisely measured quantity into the fuel dispensing conduit, or the oil is pressed into said conduit by means of a pump having a correspondingly variable feeding capacity. Mixture dispensing devices are also known, in which the speed of rotation of a pump feeding the subsidiary constituent is conveyed to a counter mechanism which in its turn is driven by the measuring element measuring the tapped quantity of the main constituent. The said measuring element at the same time effects the drive for the auxiliary feeding pump through the intervention of a friction wheel mechanism. In such installations, a constant displacement pump which permits a precise metering, can be used for supplying the subsidiary constituent. It is also known in place of a friction wheel transmission for determining the various mixture ratios of the main and subsidiary constituents, to employ a variable gear transmission between the gasoline metering device and the oil pump. The transmission ratios of the gear transmission then correspond to the ratio between the main constituent and the subsidiary constituent. Mixture and metering devices with variable gear transmission have the advantage with regard to mixture and metering devices operating with friction wheel transmissions, that the desired mixture ratio and a more precise measuring can be more accurately effected. However, with the heretofore known measuring devices equipped with variable gear transmissions difficulties have been encountered when shifting from one mixture ratio to another. This is due to the fact that when the gear teeth do not stand in proper position to be brought into mesh, the required actuation by hand of the oil pump or the gasoline meter is not always possible because of the large opposing forces. For the same reason, these mixing and metering devices are deficient as to metering accuracy.

It is, therefore, an object of the present invention to provide a mixing and metering device for the above purpose which will overcome the above mentioned drawbacks.

It is another object of this invention to provide an improved mixing and metering device of high precision.

Still another object of this invention consists in the provision of a mixing and metering device especially for filling stations, in which the setting of the desired mixing ratio will be possible in any position of the transmission even if the teeth of a corresponding clutch do not stand in the correct position to enable them to be brought into mesh.

These and other objects and advantages of the invention will appear more clearly from the following specification in connection with the accompanying drawing, in which:

Fig. 1 is a view, partly in section of a mixing and metering device according to the invention which comprises a delivery pump for the subsidiary constituent, an intermediate transmission, and a counter.

Fig. 2 is a side view of an elastic or resilient clutch for use in connection with the present invention.

Fig. 2a is a top view of the clutch according to Fig. 2.

Fig. 3 illustrates clutch members provided with teeth and forming a part of the arrangement according to the invention.

Fig. 4 shows the lower portion of Fig. 1 on a larger scale than that of Fig. 1.

The above outlined drawbacks of heretofore known mixing installations have been overcome by means of a delivery pump for the subsidiary constituent which pump is driven by a measuring element for the main constituent through the intervention of a gear transmission. More specifically, the invention is characterized in that clutch means provided with teeth and effective in one direction of rotation only are employed as control means for making the individual transmission ratios of the gear transmission effective, whereas the delivery pump for the subsidiary constituent has its input shaft connected to a resilient lost motion clutch.

More specifically, with reference to the drawing, the arrangement shown therein comprises a meter 1 including a rotatable member 1a which is driven by a pump not shown in the drawing and feeds the main constituent, i. e. gasoline, of the mixture through the conduit 2 to a manually operable dispenser not shown in the drawing. The main constituent of the mixture passing through the gasoline meter 1 drives a rotatable member 1a for measuring the quantity of flow through meter 1. This rotatable member 1a is connected by means of a clutch 3a to a shaft 3 of a gear transmission. Shaft 3 has rotatably mounted thereon four gears 8, 9, 10 and 11. Intermediate the gears 8 and 9 and also intermediate the gears 10 and 11 there are provided two couplings or clutch members 16 and 17 which are longitudinally displaceably but non-rotatably mounted on shaft 3. These coupling members are movable by control levers 20, 21 with control arms 18, 19 so as selectively to be brought into meshing engagement with corresponding coupling or clutch elements fixedly connected to the gears 8, 9, 10 and 11 respectively. The control arms 18 and 19 are longitudinally displaceably mounted on shafts 18a and 19a respectively within the transmission casing or gear box 22.

The gears 8, 9, 10 and 11 respectively mesh with the counter gears 12, 13, 14 and 15 fixedly connected to a shaft 23. By coupling the gear 11 to the coupling member 17, the gear 11 will be drivingly connected to shaft 34 through gears 15, 14, 24 thereby driving the delivery pump 26 for the subsidiary or additional constituent, e. g. oil. The rotative movement of pump 26 is by means of shaft 23, bevel gear 36, shaft 38 and bevel gear 37 and shaft 39 conveyed to a counter 4.

On the scale 5 of the counter 4 there will appear the basic price of the main constituent, while the scale 6 will indicate the dispensed quantity of the main constituent.

The amount resulting from the withdrawn quantity and the basic price will appear on the scale 7.

The transmission ratios of the four above mentioned transmission stages comprising gears 8–11 and 12–15 are so selected that, when the delivery pump 26 for the subsidiary constituent is operated, one of the four most frequently occurring mixing ratios, namely the ratios 1:15, 1:20, 1:25 and 1:30 will be obtained in conformity with the respective shifting position of the transmission. The outside of the gear box is provided with marks for indicating the various positions of the knob 20 and the associated mixture ratios. As will be evident from Fig. 4, the gear 24 is coupled to the delivery pump 26 through a resilient lost motion clutch 31, 32, 35 which latter is shown in detail in Figs. 2 and 2a. As will be clearly seen from the drawing, especially Fig. 4, the drive shaft for pump 26 consists of two sections namely the shaft 25 having fixedly connected thereto the gear 24, and the shaft 34 forming the shaft of the pump 26. The front end of shaft 34 is provided with a stud 34a rotatably journalled in a corresponding bore provided in the adjacent end of the shaft 25. Fig. 2a also clearly shows the two coupling levers 31 and 33 respectively fixedly connected to shafts 34 and 25. The coupling lever 31 carries the coupling pin 32 which engages a bore 32a provided in the coupling lever 33. The coupling pin 32 is held in engagement with lever 33 by a leaf spring 35 resting against shaft 25 and also resting against a bolt 39 screwed into the coupling lever 33.

The throwing in of the individual transmission steps, and thus the setting of the desired mixing ratio is possible with the mixing device according to the invention in any position of the transmission parts, even when the teeth of the corresponding clutch members do not stand in correct position to enable them immediately to be brought into mesh with each other. In such a case the drive shaft of the delivery pump 26 for the subsidiary constituent is moved by a very small fraction only of a revolution, and the angular movement is taken up by the resilient lost motion clutch 31, 32, 35 without the necessity of effecting any movement of the delivery pump 26 or the gasoline metering device 1. The resilient lost motion design of the clutch 31, 32, 35 is advantageous also because in this way any possible movement of the delivery pump 26 due to repeated actuation of the gear changing device will be avoided which would otherwise cause errors in the metering process. This is of particular importance during the summer when the subsidiary constituent has a low viscosity.

The employment of tooth coupling means or tooth clutches which are effective in one direction only with a sufficiently large number of teeth makes it possible to reduce to a minimum the angular stroke required during the shifting operation to move the transmission gears. This makes possible very precise measuring operations.

When the clutch control knob 20 occupies the position shown in Fig. 1, none of the clutches is engaged. In this position no oil is fed by the pump 26, which means that gasoline only is being dispensed. When the clutch 16 is thrown in so that the teeth 29 thereof mesh with the teeth 30 of the gear 9, the rotation of shaft 3 (see arrow) is transmitted to the pump drive shaft 25 through the intervention of the counter-shaft 23. The rotation of the counter-shaft 23 and therefore of the pump feeding the additional constituent, e. g. oil is communicated to the counter 4 through bevel gears 36 and 37 and shafts 38 and 39. The price per gallon of the oil will be indicated on the scale 40. The total cost of the mixture can be read on the scale 7 of the counter because the rotations of the oil pump will be added to the indication of the gasoline meter through corresponding calculating means in the counter 4.

In other words, the counter 4 superimposes in known manner the measured values of the main constituent and the subsidiary constituent and does this on the price indicator which indicates the total price of the dispensed quantity of fuel mixture. With such a mixing and metering device according to the invention it is merely necessary to set the basic prices of the two constituents of the mixture. It will then be possible following the dispensing process to read the total price for the dispensed quantity of the mixture directly on said price indicator on the counter. The counter 4 may also be designed in such a manner that further indicators will separately list the respective dispensed quantities of main constituent and subsidiary constituent. The customers buying a gasoline-oil mixture will thus be able in a simple and precise manner to check the measuring operation.

When the clutch occupies the position shown in Fig. 3, the upper teeth of the tooth clutch are in correct register with but spaced from each other, whereas the lower teeth are offset with regard to each other by approximately half the width of a tooth. The arrow indicates the direction of rotation of the shaft 3 of the counter on which the clutch body 16 is displaceably mounted. When throwing in the upper clutch portion, the driven shaft does not rotate, but it rotates by half the width of a tooth when the lower clutch member is thrown in. As a result thereof, the leaf spring 35 of the resilient coupling shown in Fig. 3 is tensioned and the coupling pin 32 is lifted off its abutment.

It is, of course, understood that the present invention is, by no means, limited to the particular construction shown in the drawing but also comprises any modifications within the scope of the appended claims.

What I claim is:

1. A mixing and metering device for a fuel mixture composed of a main constituent and a subsidiary constituent, which comprises in combination: a measuring device including a rotatable member for measuring the main constituent being dispensed, a delivery pump for pumping the subsidiary constituent being dispensed, a variable gear transmission interposed between said measuring device and said delivery pump and comprising a plurality of transmission stages, each of said transmission stages being adapted selectively to be made effective or ineffective, a pump driving shaft comprising a first section arranged for driving connection with said gear transmission and also comprising a second section connected to said delivery pump for conveying power thereto, resilient lost motion clutch means interposed between said first and second sections for effecting driving connection therebetween, and unilaterally effective tooth clutch means interposed between said variable gear transmission and said rotatable member and operable respectively to effect driving connection between said rotatable member and any one of said transmission stages.

2. A mixing and metering device for a fuel mixture composed of a main constituent and a subsidiary constituent, which comprises in combination: a measuring device including a rotatable member for measuring the main constituent being dispensed, a delivery pump for pumping the subsidiary constituent being dispensed, a counting mechanism including a rotatable shaft for indicating the quantity and price of the dispensed constituents, four gears rotatably mounted on said shaft, a countershaft, four counter wheels fixedly connected to said countershaft and respectively meshing with said four gears, two unilaterally effective clutch units mounted on said shaft, one clutch unit being arranged between two of said gears and the other clutch unit being arranged between the other two of said gears, each clutch unit comprising two tooth clutch elements respectively fixedly connected to the respective two adjacent gears and also comprising an intermediate double tooth clutch member slidable on said shaft in axial direction thereof but rotatably connected thereto, each of said double tooth clutch members being selectively movable into engagement with one or the other of the adjacent clutch elements for establishing driving connection between said rotatable shaft and the respective gear, control lever means operatively connected to said intermediate double tooth clutch members for actuating the same to selectively effect or interrupt driving connection between any of said gears and said rotatable shaft, a pump driving shaft comprising a first section arranged for driving connection with said countershaft and also comprising a second section connected to said delivery pump for conveying driving power thereto, and resilient lost motion clutch means interposed between said first and second sections for effecting driving connection therebetween.

3. A mixing and metering device according to claim 2, which includes a gear box housing said gears and gear wheels, said control lever means extending through said gear box and being operable from the outside thereof.

4. A mixing and metering device for a fuel mixture composed of a main constituent and a subsidiary constituent, which comprises in combination: a measuring device including a rotatable member for measuring the main constituent being dispensed, a delivery pump for pumping the subsidiary constituent being dispensed, a variable gear transmission interposed between said measuring device and said delivery pump and comprising a plurality of transmission stages, each of said transmission stages being adapted selectively to be made effective or ineffective, a pump driving shaft comprising a first section arranged for driving connection with said gear transmission and also comprising a second section connected to said delivery pump for conveying power thereto, unilaterally effective tooth clutch means interposed between said variable gear transmission and said rotatable member and operable respectively for effecting driving connection between said rotatable member and any one of said transmission stages, and lost motion clutch means interposed between said first and second sections for effecting driving connection therebetween, said lost motion clutch means including a first lever connected to said first section, a second lever connected to said second section and a coupling pin carried by one of said levers and engaging an aperture in the other one of said two levers, said lost motion clutch means also including a spring urging said coupling pin into engagement with said aperture, the size of said aperture being such as to allow the lever carrying said coupling pin to move back angularly by the amount of the distance between two adjacent teeth of said unilaterally effective tooth clutch means.

5. A mixing and metering device according to claim 4, in which said spring is designed as leaf spring.

6. A mixing and metering device for a fuel mixture composed of a main constituent and a subsidiary constituent, which comprises in combination: a measuring device including a rotatable member for measuring the main constituent being dispensed, a delivery pump for pumping the subsidiary constituent being dispensed, a counting mechanism including a rotatable shaft for indicating the quantity and price of the dispensed constituents, a variable gear transmission interposed between said measuring device and said delivery pump and comprising a plurality of transmission stages, each of said transmission stages being adapted selectively to be made effective or ineffective, a pump driving shaft comprising a first section arranged for driving connection with said gear transmission and also comprising a second section connected to said delivery pump for conveying power thereto, resilient lost motion clutch means interposed between said first and second sections for effecting driving connection therebetween, unilaterally effective tooth clutch means interposed between said variable gear transmission and said rotatable member and operable respectively to effect driving connection between said rotatable member and any one of said transmission stages, said counting mechanism also comprising means for computing the number of rotations of said measuring device and said pump into the respective prices for the constituents delivered thereby and for indicating the total of said prices.

7. A mixing and metering device according to claim 6, in which the number of rotations of said pump is conveyed to said counting mechanism through said gear transmission and a bevel gear system drivingly connected thereto.

References Cited in the file of this patent

UNITED STATES PATENTS

| | | |
|---|---|---|
| 1,773,723 | Cox et al. | Aug. 26, 1930 |
| 1,985,918 | De Lancey | Jan. 1, 1935 |